US010261945B1

(12) United States Patent
Blackwell et al.

(10) Patent No.: US 10,261,945 B1
(45) Date of Patent: Apr. 16, 2019

(54) SYSTEMS AND METHODS FOR STORING AND ACCESSING MONITORING DATA

(71) Applicant: Dell Software Inc., Aliso Viejo, CA (US)

(72) Inventors: Aaron Blackwell, Redding, CT (US); Matthew L. Domsch, Austin, TX (US); Michael J. Morton, Morrisville, NC (US); Charles Terrence Perusse, Pflugerville, TX (US); James T. Ahlborn, Downingtown, PA (US)

(73) Assignee: Quest Software Inc., Aliso Viejo, CA (US)

(*) Notice: Subject to any disclaimer, the term of this patent is extended or adjusted under 35 U.S.C. 154(b) by 419 days.

(21) Appl. No.: 14/613,917

(22) Filed: Feb. 4, 2015

(51) Int. Cl.
*G06F 16/13* (2019.01)

(52) U.S. Cl.
CPC .................................. *G06F 16/13* (2019.01)

(58) Field of Classification Search
CPC . G06F 17/30067; H04N 21/84; G11B 27/105; G11B 27/329; G11B 27/034
USPC .......................................................... 707/821
See application file for complete search history.

(56) References Cited

U.S. PATENT DOCUMENTS

| 9,298,796 | B2* | 3/2016 | Ostler ................... G06F 16/275 |
| 2004/0044689 | A1* | 3/2004 | Krabel .............. G06F 17/30575 |
| | | | 707/104.1 |
| 2004/0103182 | A1* | 5/2004 | Krabel .............. G06F 17/30303 |
| | | | 709/223 |
| 2004/0177075 | A1* | 9/2004 | Rangadass ........ G06F 17/30563 |
| | | | 709/223 |
| 2008/0270363 | A1* | 10/2008 | Hunt ................. G06F 17/30489 |
| | | | 707/3 |
| 2008/0288889 | A1* | 11/2008 | Hunt ...................... G06Q 30/02 |
| | | | 715/810 |
| 2008/0294996 | A1* | 11/2008 | Hunt ...................... G06Q 30/02 |
| | | | 715/739 |
| 2009/0012983 | A1* | 1/2009 | Senneville ........ G06F 17/30566 |
| | | | 707/101 |
| 2010/0106724 | A1* | 4/2010 | Anderson ......... G06F 17/30979 |
| | | | 707/737 |
| 2012/0072464 | A1* | 3/2012 | Cohen ............... G06F 17/30303 |
| | | | 707/803 |

(Continued)

OTHER PUBLICATIONS

Kobielus, James; "The Next Big "H" in Big Data: Hybrid Architectures"; IBM Data Magazine; May 6, 2013; 7 pages.

(Continued)

*Primary Examiner* — Pierre M Vital
*Assistant Examiner* — Andrew N Ho
(74) *Attorney, Agent, or Firm* — Winstead PC

(57) ABSTRACT

In one embodiment, a method includes receiving a request for a value of at least one data element defined by a master data management (MDM) model, wherein the at least one data element is based, at least in part, on monitoring data collected from a monitored system. The method further includes determining from a central data store whether the at least one data element is centrally stored or is federated. The central data store maintains a common representation of a plurality of data elements in conformance to the MDM model. The MDM model is extended to indicate whether each data element of the plurality of data elements is centrally stored or is federated. The determining is based, at least in part, on the indication.

18 Claims, 3 Drawing Sheets

(56) References Cited

U.S. PATENT DOCUMENTS

2012/0095925 A1  4/2012 Agarwal et al.
2012/0303672 A1* 11/2012 Anand .............. G06F 17/30566
  707/802
2012/0303673 A1* 11/2012 Anand .................... G06F 16/27
  707/802
2012/0303692 A1* 11/2012 Anand ................ H04L 67/1095
  709/201

OTHER PUBLICATIONS

Ariyachandra, Thilini et al.; "Which Data Warehouse Architecture is Most Successful?"; Business Intelligence Journal, vol. 11, No. 1; 2006; 3 pages.

* cited by examiner

SYSTEMS AND METHODS FOR STORING AND ACCESSING MONITORING DATA

BACKGROUND

Technical Field

The present disclosure relates generally to performance monitoring and more particularly, but not by way of limitation, to systems and methods for storing and accessing monitoring data.

History of Related Art

In information technology (IT) management, performance data may be collected from numerous sources using numerous disparate data formats. Integrating such data can be computationally expensive due to the significant amount of processing involved.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes receiving a request for a value of at least one data element defined by a master data management (MDM) model, wherein the at least one data element is based, at least in part, on monitoring data collected from a monitored system. The method further includes determining from a central data store whether the at least one data element is centrally stored or is federated. The central data store maintains a common representation of a plurality of data elements in conformance to the MDM model. The MDM model is extended to indicate whether each data element of the plurality of data elements is centrally stored or is federated. The determining is based, at least in part, on the indication. In addition, the method includes, responsive to a determination that the at least one data element is federated, retrieving the value of the at least one data element from a federated storage location. The method also includes, responsive to a determination that the at least one data element is centrally stored, retrieving the value of the at least one data element from the central data store. Moreover, the method includes providing data related to the value of the at least one data element to a requestor.

In one embodiment, an information handling system includes at least one processor, wherein the at least one processor is operable to implement a method. The method includes receiving a request for a value of at least one data element defined by a master data management (MDM) model, wherein the at least one data element is based, at least in part, on monitoring data collected from a monitored system. The method further includes determining from a central data store whether the at least one data element is centrally stored or is federated. The central data store maintains a common representation of a plurality of data elements in conformance to the MDM model. The MDM model is extended to indicate whether each data element of the plurality of data elements is centrally stored or is federated. The determining is based, at least in part, on the indication. In addition, the method includes, responsive to a determination that the at least one data element is federated, retrieving the value of the at least one data element from a federated storage location. The method also includes, responsive to a determination that the at least one data element is centrally stored, retrieving the value of the at least one data element from the central data store. Moreover, the method includes providing data related to the value of the at least one data element to a requestor.

In one embodiment, a computer-program product includes a non-transitory computer-usable medium having computer-readable program code embodied therein. The computer-readable program code is adapted to be executed to implement a method. The method includes receiving a request for a value of at least one data element defined by a master data management (MDM) model, wherein the at least one data element is based, at least in part, on monitoring data collected from a monitored system. The method further includes determining from a central data store whether the at least one data element is centrally stored or is federated. The central data store maintains a common representation of a plurality of data elements in conformance to the MDM model. The MDM model is extended to indicate whether each data element of the plurality of data elements is centrally stored or is federated. The determining is based, at least in part, on the indication. In addition, the method includes, responsive to a determination that the at least one data element is federated, retrieving the value of the at least one data element from a federated storage location. The method also includes, responsive to a determination that the at least one data element is centrally stored, retrieving the value of the at least one data element from the central data store. Moreover, the method includes providing data related to the value of the at least one data element to a requestor.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
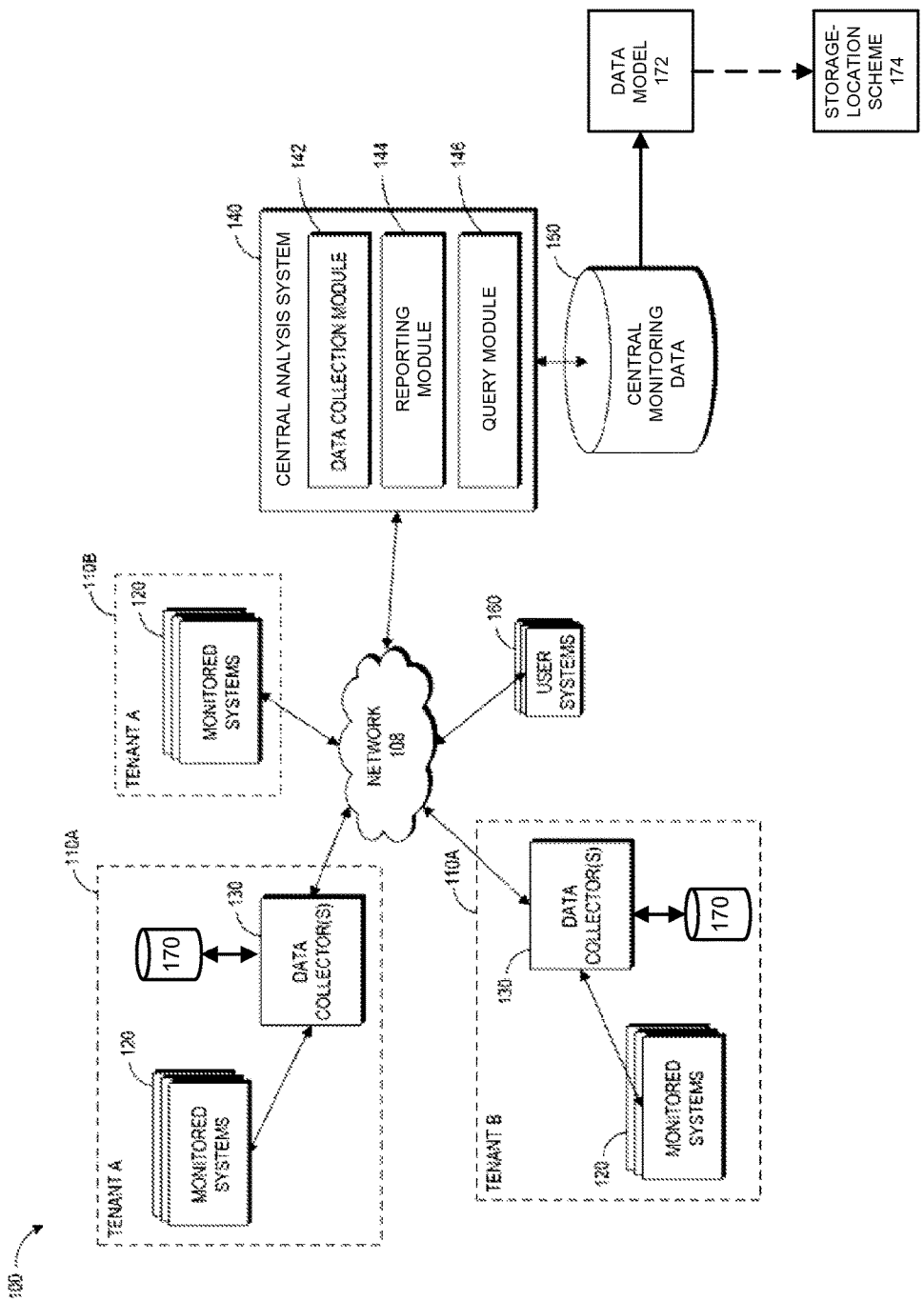
FIG. 1 illustrates an example computing environment.

When deploying a solution to a complex information technology (IT) management problem, it is often necessary to deploy multiple individual products integrated together to fully meet the needs of the solution. Frequently, it is necessary to draw data, especially monitoring data, from multiple products to the solution level where common reports and dashboards can be created that give a full solution perspective to performance. Each of these individual products usually contains a reporting capability on its own data, but when the need arises in the solution to do cross-product reporting, the solution generally must contain this cross-domain report capability and draw data from each of the component products for incorporation and integration into the solution.

This cross-domain reporting problem brings unique challenges to reporting at the solution level. A first such challenge is master data management. Each of the component products typically have their own notions, for example, of primary keys, taxonomy and schema, and time references. Each component also typically has a host of domain-specific aspects to its data that make it hard to correlate metrics from one product to another. As an example, one product may identify client devices based on a serial number of the device, another based on a configured Internet Protocol (IP) address, and yet another based on a configured host name. In general, it is the domain of MDM to map product rules to each of these identifiers so that the common query and reporting at the solution level knows, for example, that a particular IP address (e.g., 172.22.33.123), a particular serial number (e.g., 32344323A2), and a particular fully qualified domain name (e.g., server1.mydomain.com) refer to a same device or host.

A second such challenge is storage of monitoring data. As indicated above, each component product in the solution may capture monitoring data such as, for example, specific performance metrics, as required to fulfill specific use cases that it is intended to solve. Each product can define its data persistence model based on the unique needs of these use cases. One product may store data in a relational database, another in a flat file, and another in a proprietary time-series database, as examples. In a solution that integrates multiple products, however, the number of storage options can be quite large. Thus, it can be complicated for the solution to query information from each of the component products.

A third such challenge is querying the monitoring data. When a solution needs to query data across domain products, it typically needs a common query model so that it does not have to know the particulars (e.g., schema, indices, etc.) of each product in the integrated solution.

One approach for addressing the above problems is a fully federated approach. According to the fully federated approach, monitoring data such as, for example, performance metrics, may be stored and queried from the component products, or spokes, in near real-time as needed. There is typically some type of federation layer in the middle (e.g., a data model, application programming interfaces (APIs), etc.) that normalizes the query to the caller. The federation layer generally translates the query according to the particular requirements of each domain product (e.g., the domain product's data model, APIs, etc.) and then merges the results together into a normalized solution model based on a MDM approach.

In the fully federated approach, all data typically lives at the spokes and is queried as needed. Advantages of the fully federated approach generally include the lack of any need for a central repository of data, which would be a duplication of the data at the spokes, and minimal overhead data movement since only the specific data being queried (e.g., for a report or dashboard) is moved through the integration tiers. However, the fully federated approach can be extremely slow. For example, every report generation or dashboard refresh may cause a fan-out query to several different products. Furthermore, if any one of the integrated products is off-line, reporting and dashboards, for example, may not function properly.

Another approach for addressing the above problems is a fully centralized approach. According to the fully centralized approach, all monitoring data is typically extracted from the spokes into a common centralized data repository, often called a data mart, which the solution then queries when it is time to generate, for example, reports and dashboards. As compared to the fully federated approach, querying can be much faster in the fully centralized approach because, for example, data is pre-fetched and the normalization process is already completed. However, the fully centralized approach can require a huge amount of centralized storage, which is redundant storage since the data is already stored at the spokes. In general, all data must be acquired since it is not typically known what queries are actually going to be executed, for example, by the reports later. Therefore, huge amounts of data typically must be pre-fetched.

The present disclosure describes examples of improving query performance and storage efficiency by extending a data model (e.g., a MDM model). In certain embodiments, the data model for monitoring data such as, for example, performance metrics, can be extended so as to enable indication, for each data element, whether the data element is centrally stored or is federated. In that way, the extended data model can enable strategic decisions regarding which data elements are centrally stored and which data elements are federated. Such decisions can be based on strategic criteria such as, for example, how often a given data element is utilized in reports and dashboards, whether a given data element is a derived (i.e., calculated) metric, a complexity of calculating or retrieving a given data element, etc. Advantageously, in certain embodiments, data-storage redundancy as compared, for example, to the fully centralized approach, can be reduced. Also, speed of query execution as compared, for example, to the fully federated approach, can be greatly increased.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an example computing environment 100 for implementing a central analysis system 140. In the computing environment 100, tenant systems 110 connect to the central analysis system 140 over a network 108, which may be a private network, a public network, a local or wide area network, the Internet, combinations of the same, or the like. Each of the tenant systems 110 can represent an installation of physical and/or virtual computing infrastructure. Collectively, the tenant systems 110 can represent a federated aspect of the computing environment 100. In general, the tenant systems 110 can provide various types of monitoring data to the central analysis system 140, including, for example, performance data (e.g., performance metrics) and system configuration data.

The tenant systems 110 shown can be owned or operated by the same or different entities. For example, two of the tenant systems 110 installed in separate locations are shown as owned or operated by "Tenant A," while another system 110 is owned or operated by a different tenant, "Tenant B." Tenants A and B can represent customers (e.g., entities such as companies or individuals) of an operator of the central analysis system 140. Collectively, tenant systems 110 monitored by the central analysis system 140 can be part of a federation. Although the term "tenant" is used herein to describe the systems 110 or owners/operators thereof, in addition to having its ordinary meaning, the term "tenant" can, but need not, refer to tenancy in a multitenant software architecture.

Each of the tenant systems 110 includes one or more monitored systems 120. The monitored systems 120 can include physical and/or virtual computing devices, such as physical machines and/or virtual machines. For instance, a monitored system 110 may include any of the following: an information handling system, a virtual machine, server, web server, application server, database, application, processor, memory, hard drive or other storage device, peripheral, software component, database tables, tablespaces in a database, application tiers, network switches or other network hardware, combinations of the same or the like. Any given tenant system 110 can include from one to several monitored systems 120. For example, a tenant system 110 can represent an entire data center having hundreds or even thousands of monitored systems 120.

Data collectors 130 and local data stores 170 can be provided in some or all of the tenant systems 110. In the depicted embodiment, data collectors 130 and local data stores 170 are shown in a pair of the tenant systems 110A. No data collector 130 or local data store 170 is provided in one of the tenant systems 110B, which tenant can be an example of a data collection module 142 of the central analysis system 140 in some cases directly collecting monitoring data from the monitored systems 120. In some embodiments, the tenant systems 110 can additionally maintain a cache (not explicitly shown) for storing metrics derived from data elements in the local data store 170. In these embodiments, the tenant systems 110, or the data collectors 130, could be configured to periodically compute the derived metrics and store in the cache.

The data collectors 130 can be software and/or hardware agents, appliances, or the like that collect monitoring data about the monitored systems 120. This monitoring data can include time-series data related to the performance of physical and/or software components (including virtual components), such as performance related to any of the monitored systems 120 described above. The monitoring data can also include information about attributes, characteristics, or properties of the monitored systems 120, such as the number of processors in each host device, memory or storage capacity, hardware or software specifications, virtual machine characteristics, and so forth. The data collectors 130 can collect this monitoring data in real-time, periodically, e.g., according to a schedule, on-demand, or a combination of the same, and store the monitoring data in the local data stores 170. In some tenant system 110 installations having many monitored systems 120, one or more management servers (not shown) can manage data collection of a plurality of data collectors 130.

As mentioned above, the data collectors 130 can store the collected monitoring data in the local data stores 170. In addition, the data collectors 130 can provide the collected monitoring data to the central analysis system 140 upon request, or, in some cases, as a live stream. Other tenant systems 110 that do not have local data collectors 130, such as the tenant system 110B, can provide monitoring data directly to the central analysis system 140. The central analysis system 140, or more specifically the data collection module 142, can access this data remotely by querying libraries or APIs of the tenant systems 110B, thereby replacing the functionality of the data collectors 130 in some embodiments. More generally, in other embodiments, local data collectors 130 or other agents may be omitted, or each tenant system 110 can include one or more data collectors 130.

For smaller computing environments, the central analysis system 140 can be implemented as a single management server. Alternatively, the central analysis system 140 can be implemented in a plurality of virtual or physical servers, which may or may not be geographically co-located. For example, the central analysis system 140 and/or other aspects of the computing environment 100 may be hosted in a cloud-based hosting service such as the Azure™ service provided by Microsoft® or the EC2™ platform provided by Amazon®.

Example implementations for collecting data using agents and management servers is described in the following U.S. Patents and Applications, each of which is hereby incorporated by reference in its entirety: U.S. Pat. No. 7,979,245, filed May 16, 2007, titled "Model-Based Systems and Methods for Monitoring Computing Resource Performance," ("the '245 patent") and U.S. application Ser. No. 12/370,399 ("the '399 application"). The central analysis system 140 and data collectors 130 can implement some or all of the features described in the '245 patent and the '399 application.

In certain embodiments, the central data store 150 implements a data model 172. The data model 172 can be, for example, a MDM data model as described above. The data model 172 typically provides a common representation of, and a single point of reference for, monitoring data collected in the computing environment 100. For example, the data model 172 can specify, inter alia, a structure of each element of monitoring data the central analysis system 140 is operable to receive. As illustrated, the data model 172 is extended to include a storage-location scheme 174.

In a typical embodiment, the storage-location scheme 174 enables specification, for each element of monitoring data defined in the data model 172, of whether the element is centrally stored in the central data store 150 in addition to being locally stored on the local data stores 170. Data elements that are not stored in the central data store 150 are generally only stored in the local data stores 170 and thus may be considered to be federated. For these data elements, the central data store 150 may store, for example, a reference, pointer, link or the like to a location in memory or on a network where the data elements are stored (e.g., to any of the tenant systems 110 and/or any of the local data stores 170). For centrally stored data elements, in various cases, the data collection module 142 can request and store, or prefetch, monitoring data including these data elements from the data collectors 130 or directly from the monitored systems 120 (e.g., using web service calls or other remote procedure calls) at configurable intervals (e.g., hourly, daily, etc.). In other cases, the data collection module 142 can receive the monitoring data from the data collectors 130, for example, as a live stream, without issuing any request.

Thus, the storage-location scheme 174 can allow the central data store 150 to include an indication of whether each data element of the data model 172 is centrally stored or is federated. In some implementations, the storage-location scheme 174 can be implemented as an indicator (e.g., code or identifier) attached to each data element that indicates whether the data element is centrally stored or is federated. In other implementations, the storage-location scheme 174 can be implemented as a tagging system in which only centrally stored data elements are tagged (and non-tagged data elements may be considered to be federated), only federated data elements are tagged (and non-tagged data elements may be considered to be centrally stored), and/or the like. Other variations and options relative to the storage-location scheme 174 will be apparent to one skilled in the art after reviewing the present disclosure.

In certain embodiments, the storage-location scheme 174 can be automatically implemented on the central analysis system 140. For example, the storage-location scheme 174 can include, or be associated with, criteria against which data elements of the data model 172 are automatically analyzed or evaluated. If the automated criteria is satisfied (or not satisfied, depending on implementation), a given data element can be indicated as centrally stored or federated, as applicable.

In an example, the automated criteria could specify that derived metrics be centralized. A derived metric may be a performance metric that is calculated from other performance metrics. According to this example, it may be possible to automatically determine that some data elements are derived metrics, for example, based on the existence of rules or formulas (e.g., in the central data store 150) that define the data elements' values in terms of other data elements such as other performance metrics. In this example, data elements determined to be derived metrics can be attached to a central-storage indicator in the central data store 150. For purposes of this example, all other data elements can be attached to a federated-storage indicator in the central data store 150.

In another example, the automated criteria could specify a frequency threshold such that data elements needed more often than the frequency threshold should be centrally stored. The frequency threshold can be specified in terms of requests per hour, day, and/or the like. In certain embodiments, the central analysis system 140 can access, for example, reporting schedules (e.g., from the reporting module 144) to determine when each data element is needed. According to this example, data elements needed more frequently than the threshold frequency can be attached to a central-storage indicator in the central data store 150. Data elements not needed more frequently than the threshold frequency can be attached to a federated-storage indicator in the central data store 150.

In yet another example, the automated criteria could specify that data elements which satisfy a complexity threshold are centrally stored. For instance, the complexity threshold could be specified in terms of an average or median time to query and retrieve a value of a given data element from the tenant systems 110. In various cases, the average or median time can be accessed or computed from logs, audit trails, etc. The complexity threshold can also be specified in other suitable ways. According to this example, data elements satisfying the complexity threshold can be attached to a central-storage indicator in the central data store 150. For purposes of this example, data elements not satisfying the complexity threshold can be attached to a federated-storage indicator in the central data store 150.

It should be appreciated that the storage-location scheme 174 can also be implemented in many other suitable ways that will be apparent to one skilled in the art after reviewing the present disclosure. For example, the storage-location scheme 174 can include automated criteria that includes a combination of any of the foregoing example criteria and/or other suitable criteria. In some implementations, the storage-location scheme 174 can be manually implemented based on domain expertise of IT professionals. In still other implementations, the central analysis system 140 can train itself using a machine-learning algorithm. Examples of machine-learning algorithms that can be implemented by the central analysis system 140 include decision tree learning, association rule learning, artificial neural networks, inductive logical programming, support vector machines, clustering, Bayesian networks, reinforcement learning, and/or the like. In that way, the central analysis system 140 can perfect its application of the storage-location scheme 174 over time, for example, by progressively learning characteristics of centrally stored data elements and characteristics of federated data elements. In some implementations, the progressive learning can be facilitated by IT professionals providing manual storage indications, and potentially associated variable values, as inputs.

In the depicted embodiment, the central analysis system 140 includes the data collection module 142, a reporting module 144, and a query module 146. Each of these components can be implemented with hardware and/or software, including (optionally) virtual machines. In an example, the central analysis system 140 can be implemented as a single management server. In another example, the central analysis system 140 can be implemented in a plurality of virtual or physical servers, which may or may not be geographically co-located. For instance, the central analysis system 140 and/or other aspects of the computing environment 100 may be hosted in a cloud-based hosting service such as the Azure™ service provided by Microsoft® or the EC2™ platform provided by Amazon®.

As described above, the data collection module 142 can, in some cases, collect monitoring data directly from the monitored systems 120 (e.g., using web service calls or other remote procedure calls) for storage in the central data store 150. The reporting module 144 can generate regular or on-demand reports related to the monitoring data. In various cases, these reports can provide a snapshot of some or all of the monitored systems 120. The reporting module 144 typically accesses the monitoring data via the query module 146. The reporting module 144 can publish reports or other generated information, for example, to a web page, dashboard, and/or the like.

The query module 146 can generate and execute a query of the central data store 150. In some embodiments, the query module 146 can use the storage-location scheme 174 to access values of data elements that, in various cases, may be centrally stored or federated. An example will be described with respect to FIG. 3.

The web page, user dashboard or other user interface(s) output, for example, by the reporting module 144, can be accessed by users of user systems 160. The query module 146 can also provide a user interface, for instance, that allows the users of the user systems 160 to obtain customized data related to any data maintained by the central data store 150. The user systems 160 can include any type of computing device, including information handling systems such as desktops, laptops, tablets, smartphones, PDAs, to name a few. The user systems 160 can be operated by users associated with the tenants or by other users.

Figure 2:
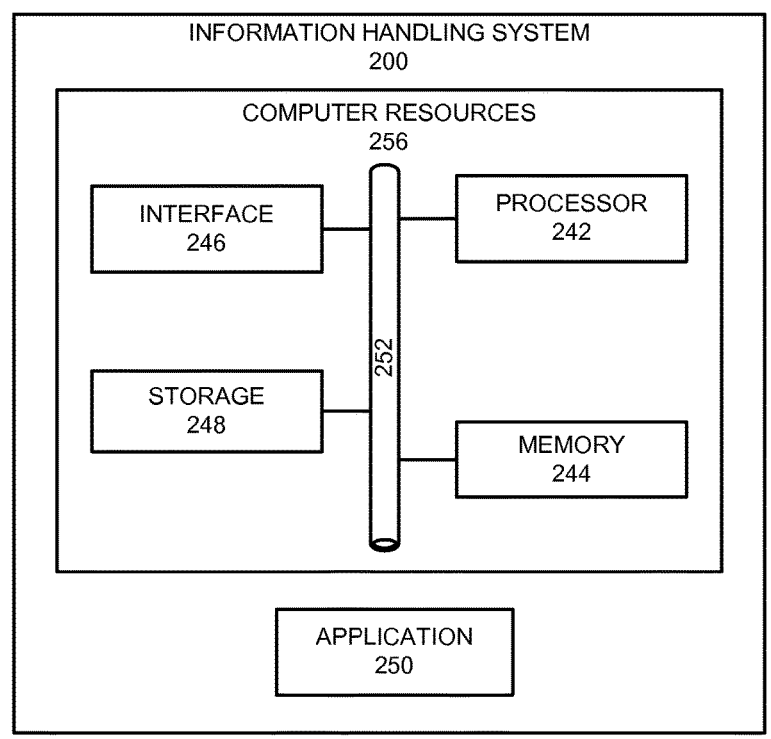
FIG. 2 illustrates an example of an information handling system.

FIG. 2 illustrates an example of an information handling system 200 that, in some cases, can be representative, for example, of the tenant systems 110, the monitored systems 120, the data collectors 130, the user systems 160 and/or the central analysis system 140 of FIG. 1. The information handling system 200 includes an application 250 operable to execute on computer resources 256. The application 250 can be similar, for example, to the data collection module 142, the reporting module 144, the query module 146 and, in some cases, the data collectors 130. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
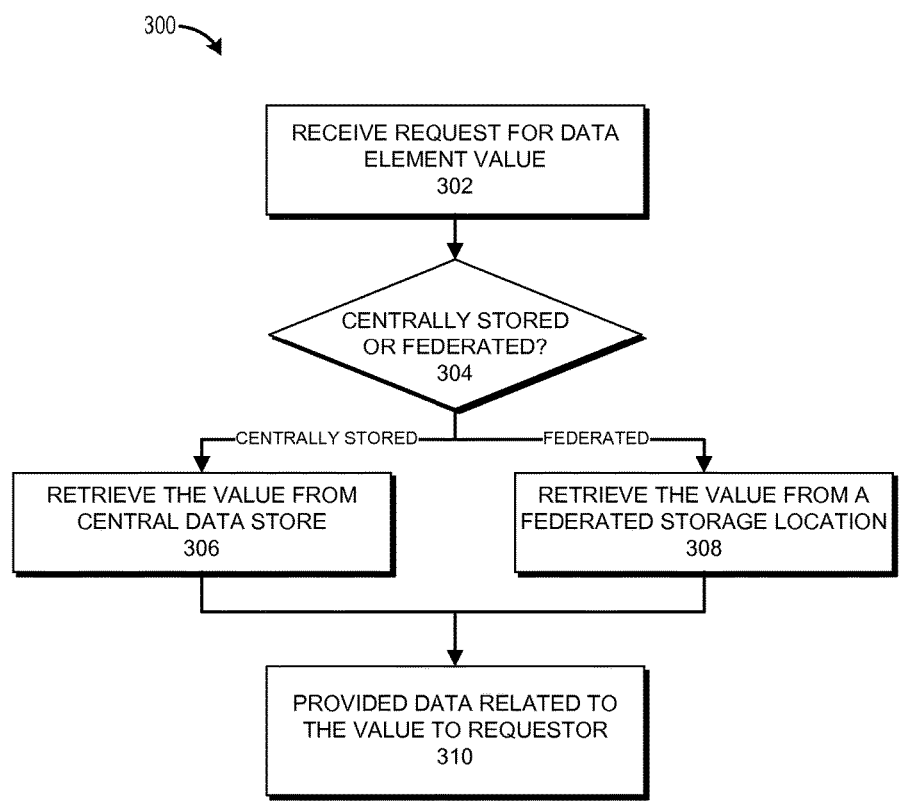
FIG. 3 illustrates an example of a process for querying monitoring data using an extended data model.

FIG. 3 illustrates an example of a process 300 for querying monitoring data using an extended data model such as the data model 172. For example, the process 300, in whole or in part, can be implemented by one or more of the central analysis system 140, the data collection module 142, the reporting module 144, and/or the query module 146. The process 300 can also be performed generally by the computing environment 100. Although any number of systems, in whole or in part, can implement the process 300, to simplify discussion, the process 300 will be described in relation to specific systems or subsystems of the computing environment 100.

At block 302, the query module 146 receives a request, from a requestor, for a value of a data element defined by the data model 172. The requestor can be, for example, the reporting module 144, which may be requesting the data element for a user dashboard, a scheduled or on-demand report, etc. The requestor can also be, for example, an administrator or other user via the user systems 160, one of the tenant systems 110, a network node in communication with the central analysis system 140, and/or the like. In many cases, the request may specify numerous data elements. In such cases, the process 300 may proceed iteratively or, alternatively, in parallel, with respect to each such element.

At decision block 304, the query module 146 determines whether the data element is centrally stored or is federated. In a typical embodiment, the determination can be made from the central data store 150 using the storage-location scheme 174 as described above. If it is determined at the decision block 304 that the data element is centrally stored, the process 300 proceeds to block 306. At block 306, the query module 146 retrieves the value from the central data store 150. From block 306, the process 300 proceeds to block 310.

If it is determined at the decision block 304 that the data element is federated, the process 300 proceeds to block 308. At block 308, the query module 146 retrieves the value from a federated storage location. The federated storage location can be, for example, one of the tenant systems 110 or, more specifically, one of the local data stores 170 managed by the tenant systems 110. As described above, the central data store 150 can store a location identifier such as, for example, a reference, pointer or link, that can be used to direct the query module 146 to the federated storage location. From block 308, the process 300 proceeds to block 310.

At block 310, the query module 146 provides data related to the value of the requested data element to the requestor. For example, in many cases, the value, and/or an analysis thereof, can be provided to the requestor. If the requestor is the reporting module 144, the data element may be included in a report or dashboard.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
   receiving a request for a value of at least one data element defined by a master data management (MDM) model, wherein the at least one data element is based, at least in part, on monitoring data collected from a monitored system;
   determining from a central data store whether the at least one data element is centrally stored or is federated;
   wherein the central data store maintains a common representation of a plurality of data elements in conformance to the MDM model;
   wherein the MDM model is extended to include a storage-location scheme that indicates whether each data element of the plurality of data elements is:
      centrally stored such that values of the data element are centrally stored in the central data store in addition to being locally stored on a respective local data store; or
      federated such that the values of the data element are locally stored in the respective local data store and are not centrally stored in the central data store, and such that a location identifier of the values in the respective local data store is stored in the central data store;
   wherein, for each data element of the plurality of data elements, the indication is based on a previous automatic implementation of the storage-location scheme, the automatic implementation comprising:

automatically analyzing the data element against automated criteria associated with the storage-location scheme;

responsive to a determination, based at least partly on the automatic analysis, of central storage for the data element, indicating in the central data store that the data element is centrally stored, such that the values of the data element are centrally stored in the central data store in addition to being locally stored in the respective local data store; and responsive to a determination, based at least partly on the automatic analysis, of federated storage for the data element, indicating in the central data store that the data element is federated, such that the values of the data element are not centrally stored in the central data store, and such that a location identifier of the values in the respective local data store is stored in the central data store;

wherein the determining is based, at least in part, on the indication;

responsive to a determination that the at least one data element is federated, retrieving the value of the at least one data element from a federated storage location;

determining based, at least in part, on the retrieved value of the at least one data element from the federated storage location, that the at least one data element be identified as centrally stored;

responsive to the determining that the at least one data element be identified as centrally stored, modifying the storage-location scheme to indicate that the values of the at least one data element are centrally stored in the central data store in addition to being locally stored on the respective local data store; and providing data related to the value of the at least one data element to a requestor.

2. The method of claim 1, wherein the central data store stores a reference to the federated storage location.

3. The method claim 1, wherein:
the automatic analysis comprises a determination of whether each data element is a derived metric; and
for each derived metric, the central data store includes a central-storage indicator.

4. The method claim 1, wherein:
the automatic analysis comprises a determination of how often the at least one data element is needed based, at least in part, on an automated review of a reporting schedule;
for data elements needed more frequently than a threshold frequency, the central data store includes a central-storage indicator; and
for data elements not needed more frequently than the threshold frequency, the central data store includes a federated-storage indicator.

5. The method of claim 1, wherein:
the automatic analysis comprises a complexity evaluation of the at least one data element;
for data elements satisfying a complexity threshold, the central data store includes a central-storage indicator; and
for data elements not satisfying the complexity threshold, the central data store includes a federated-storage indicator.

6. The method of claim 1, wherein the automatic analysis comprises an analysis of each data element of a plurality of data elements based on a combination of criteria comprising: whether the data element is a derived metric, a frequency at which the data element is needed, and a complexity of obtaining the data element.

7. The method of claim 1, comprising:
periodically pre-fetching, from a plurality of federated locations, values of data elements that are indicated in the central data store to be centrally stored; and
storing the pre-fetched values in the central data store.

8. The method of claim 1, comprising:
periodically receiving, without requesting, values of data elements that are indicated in the central data store to be centrally stored;
wherein the received values are received from a plurality of federated storage locations; and
storing the received values in the central data store.

9. The method of claim 1, wherein:
the at least one data element is a derived metric from one or more other data elements;
the federated storage location comprises a cache on a federated computer system; and
the federated computer system computes the derived metric and stores the derived metric in the cache.

10. The method of claim 1, wherein the indication in the central data store is selected from the group consisting of: a tag of centrally-stored data elements, a tag of federated data elements, and a separate indicator for each data element.

11. An information handling system comprising at least one processor, wherein the at least one processor is operable to implement a method comprising:
receiving a request for a value of at least one data element defined by a master data management (MDM) model, wherein the at least one data element is based, at least in part, on monitoring data collected from a monitored system;
determining from a central data store whether the at least one data element is centrally stored or is federated;
wherein the central data store maintains a common representation of a plurality of data elements in conformance to the MDM model;
wherein the MDM model is extended to include a storage-location scheme that indicates whether each data element of the plurality of data elements is:
centrally stored such that values of the data element are centrally stored in the central data store in addition to being locally stored on a respective local data store; or
federated such that the values of the data element are locally stored in the respective local data store and are not centrally stored in the central data store, and such that a location identifier of the values in the respective local data store is stored in the central data store;
wherein, for each data element of the plurality of data elements, the indication is based on a previous automatic implementation of the storage-location scheme, the automatic implementation comprising:
automatically analyzing the data element against automated criteria associated with the storage-location scheme;
responsive to a determination, based at least partly on the automatic analysis, of central storage for the data element, indicating in the central data store that the data element is centrally stored, such that the values of the data element are centrally stored in the central data store in addition to being locally stored in the respective local data store; and responsive to a determination, based at least partly on the automatic analysis, of federated storage for the data element, indicating in the central data store that the data element is federated, such that the values of the data element are not centrally stored in the central data store, and such that a location identifier of the values in the respective local data store is stored in the central data store;

wherein the determining is based, at least in part, on the indication;

responsive to a determination that the at least one data element is federated, retrieving the value of the at least one data element from a federated storage location;

determining based, at least in part, on the retrieved value of the at least one data element from the federated storage location, that the at least one data element be identified as centrally stored;

responsive to the determining that the at least one data element be identified as centrally stored, modifying the storage-location scheme to indicate that the values of the at least one data element are centrally stored in the central data store in addition to being locally stored on the respective local data store; and providing data related to the value of the at least one data element to a requestor.

12. The information handling system of claim 11, wherein the central data store stores a reference to the federated storage location.

13. The information handling system claim 11, wherein:
the automatic analysis comprises a determination of whether each data element is a derived metric; and
for each derived metric, the central data store includes a central-storage indicator.

14. The information handling system claim 11, wherein:
the automatic analysis comprises a determination of how often the at least one data element is needed based, at least in part, on an automated review of a reporting schedule;
for data elements needed more frequently than a threshold frequency, the central data store includes a central-storage indicator; and
for data elements not needed more frequently than the threshold frequency, the central data store includes a federated-storage indicator.

15. The information handling system claim 11, wherein:
the automatic analysis comprises a complexity evaluation of the at least one data element;
for data elements satisfying a complexity threshold, the central data store includes a central-storage indicator; and
for data elements not satisfying the complexity threshold, the central data store includes a federated-storage indicator.

16. The information handling system claim 11, wherein the automatic analysis comprises an analysis of each data element of a plurality of data elements based on a combination of criteria comprising: whether the data element is a derived metric, a frequency at which the data element is needed, and a complexity of obtaining the data element.

17. The information handling system of claim 11, the method comprising:
periodically pre-fetching, from a plurality of federated locations, values of data elements that are indicated in the central data store to be centrally stored; and
storing the pre-fetched values in the central data store.

18. A computer-program product comprising a non-transitory computer-usable medium having computer-readable program code embodied therein, the computer-readable program code adapted to be executed to implement a method comprising:

receiving a request for a value of at least one data element defined by a master data management (MDM) model, wherein the at least one data element is based, at least in part, on monitoring data collected from a monitored system;

determining from a central data store whether the at least one data element is centrally stored or is federated;

wherein the central data store maintains a common representation of a plurality of data elements in conformance to the MDM model;

wherein the MDM model is extended to include a storage-location scheme that indicates whether each data element of the plurality of data elements is:
centrally stored such that values of the data element are centrally stored in the central data store in addition to being locally stored on a respective local data store; or
federated such that the values of the data element are locally stored in the respective local data store and are not centrally stored in the central data store, and such that a location identifier of the values in the respective local data store is stored in the central data store;

wherein, for each data element of the plurality of data elements, the indication is based on a previous automatic implementation of the storage-location scheme, the automatic implementation comprising:
automatically analyzing the data element against automated criteria associated with the storage-location scheme;
responsive to a determination, based at least partly on the automatic analysis, of central storage for the data element, indicating in the central data store that the data element is centrally stored, such that the values of the data element are centrally stored in the central data store in addition to being locally stored in the respective local data store; and responsive to a determination, based at least partly on the automatic analysis, of federated storage for the data element, indicating in the central data store that the data element is federated, such that the values of the data element are not centrally stored in the central data store, and such that a location identifier of the values in the respective local data store is stored in the central data store;

wherein the determining is based, at least in part, on the indication;

responsive to a determination that the at least one data element is federated, retrieving the value of the at least one data element from a federated storage location;

determining based, at least in part, on the retrieved value of the at least one data element from the federated storage location, that the at least one data element be identified as centrally stored;

responsive to the determining that the at least one data element be identified as centrally stored, modifying the storage-location scheme to indicate that the values of the at least one data element are centrally stored in the central data store in addition to being locally stored on the respective local data store; and providing data related to the value of the at least one data element to a requestor.

* * * * *